July 11, 1950 M. G. CROSBY 2,514,443
SELECTIVITY CONTROL SYSTEM
Filed June 7, 1943 2 Sheets-Sheet 1

INVENTOR.
MURRAY G. CROSBY
BY H. G. Grover
ATTORNEY

July 11, 1950 M. G. CROSBY 2,514,443

SELECTIVITY CONTROL SYSTEM

Filed June 7, 1943 2 Sheets-Sheet 2

INVENTOR.
MURRAY G. CROSBY
BY H. G. Grover
ATTORNEY

Patented July 11, 1950 2,514,443

UNITED STATES PATENT OFFICE 2,514,443

SELECTIVITY CONTROL SYSTEM

Murray G. Crosby, Riverhead, N. Y., assignor to Radio Corporation of America, a corporation of Delaware Application June 7, 1943, Serial No. 489,923

3 Claims. (Cl. 250—20)

Figures 1, 2, 4:
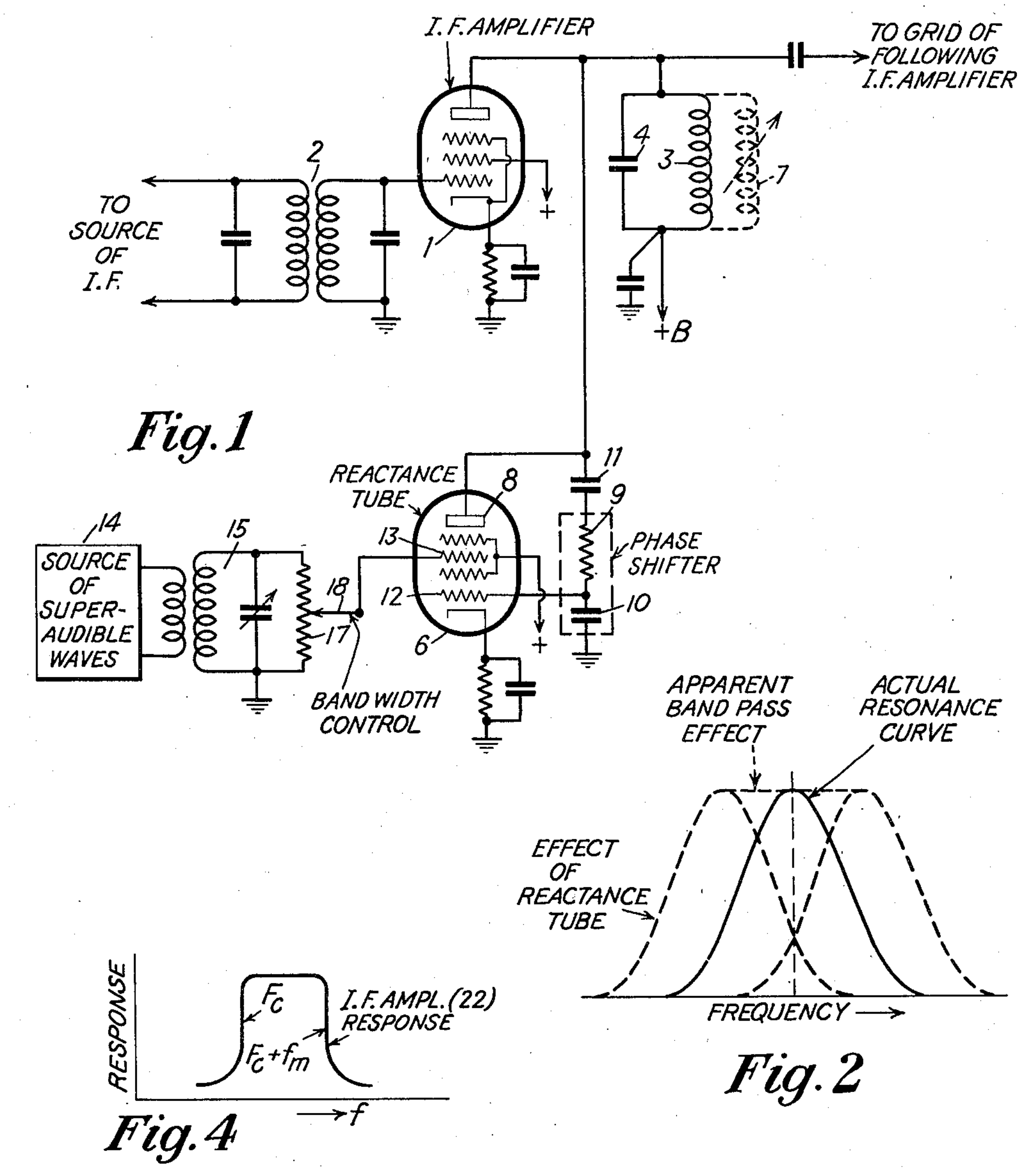

My present invention relates to selectivity control of radio signal receiving systems, and more particularly to a novel method of providing a band-pass characteristic in a radio receiver.

An important object of my invention is to provide a relatively wide pass-band characteristic for a signal selector circuit, the pass-band being widened periodically at a superaudible rate.

Another important object is to provide a substantially flat-topped band-pass response for an amplifier whose selector circuit normally has a single-peaked response, the band-pass response being produced by an electronic reactance whose effect is varied at a superaudible rate.

Another object of my invention is to frequency modulate the local oscillator of a superheterodyne receiver whose intermediate frequency amplifier has a normal flat-topped, band-pass response of relatively narrower width than the received band of frequencies; the extent of modulation of the oscillator being controlled by received signal carrier amplitude.

Still another object of my invention is to provide a superheterodyne receiver which has an intermediate frequency amplifier whose response is a band-pass with a substantially flat-top, frequency modulation at a superaudible rate being applied to the local oscillator in order to modulate the received carrier so as to alternately pass through the amplifier the upper side band of the carrier and the lower side band, whereby the average output of the band-pass amplifier covers a frequency range dependent upon the degree of modulation applied.

A more specific object of my invention is to provide a radio receiver of the superheterodyne type wherein the local oscillator is frequency modulated to a degree dependent upon received signal carrier amplitude so as to produce a variable band width transmission effect dependent upon signal carrier strength.

Still other features will best be understood by reference to the following description, taken in connection with the drawing, in which I have indicated diagrammatically several circuit organizations whereby my invention may be carried into effect.

Figure 5:
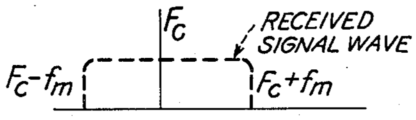
Figure 3:
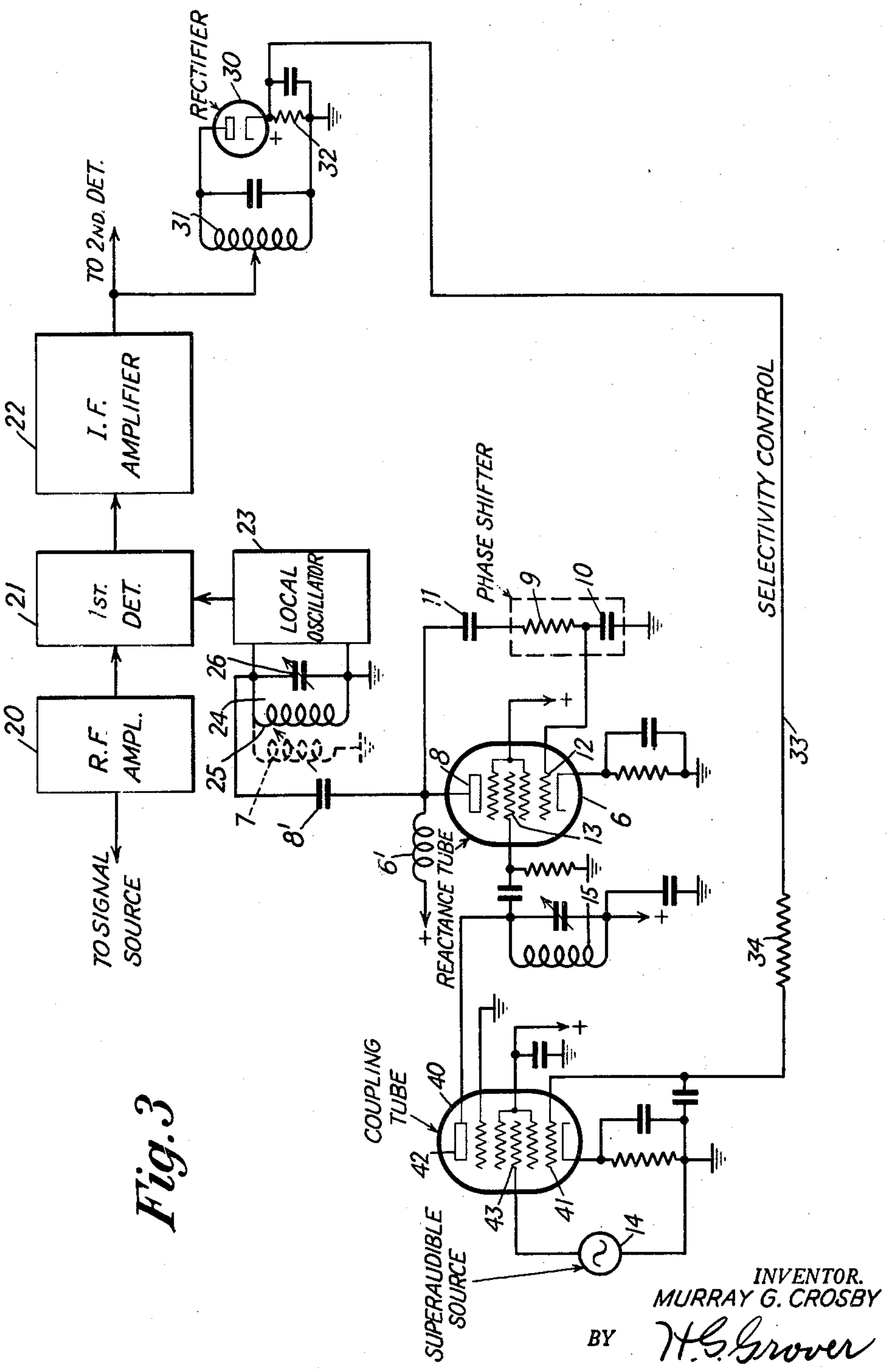

In the drawing:

Fig. 1 shows one embodiment of my invention as applied to the intermediate frequency amplifier of a superheterodyne receiver, Fig. 2 graphically shows an ideal response characteristic of the amplifier output circuit in Fig. 1, Fig. 3 shows a modification of the invention, Fig. 4 shows an ideal relatively narrow band-pass response characteristic of the intermediate frequency amplifier of Fig. 3, Fig. 5 shows the relatively wider band of the received signal wave received by a system of the type shown in Fig. 3.

In order to explain the generic concept of my present invention, there is shown in Fig. 1 the manner in which my present method may be employed to provide an apparently flat-topped, band-pass response characteristic of a resonant selector circuit. By way of illustration, assume the circuit normally has a single-peak resonance curve. Let it be further assumed that the numeral 1 designates any well known form of amplifier tube, such as the intermediate frequency (I. F.) amplifier of a conventional superheterodyne receiver. For the purposes of my invention it is immaterial whether the receiver is employed for receiving amplitude modulated carrier waves, frequency modulated carrier waves, or phase modulated carrier waves. In the reception of any of these forms of modulated waves, it is important that the selector circuits of the receiver have the requisite pass-band so as to pass all the modulation components of the modulated carrier wave energy. For the purposes of this specification, and merely by way of simple illustration, let it be assumed that the receiver is one employed in the present amplitude modulation broadcast band covering a range of 550 to 1700 kilocycles (kc.) per second.

Those skilled in the art are fully acquainted with the manner of constructing a superheterodyne broadcast receiver. It is sufficient to point out that the numeral 2 indicates the usual resonant input transformer which couples the first detector output circuit to the input electrodes of amplifier 1. Of course, the primary and secondary circuits of transformer 2 may be tuned so as to pass the intermediate frequency energy efficiently. Assuming that the I. F. band centers approximately about to 450 kc., as commonly employed in broadcast reception, the transformer 2 will be correspondingly tuned.

In the plate circuit of the amplifier tube 1 there is arranged a tuned circuit which consists of a coil 3 shunted by a tuning condenser 4. The resonant circuit 4—3 has a resonance curve as is indicated by the solid line curve in Fig. 2. This is a purely illustrative ideal representation of the normal form of response curve for a single tuned circuit. The peak frequency of circuit 4—3 will be located at the operating I. F. The amplified I. F. energy developed across the resonant circuit 4—3 will be transmitted through a coupling condenser to the grid of a following I. F. amplifier tube. It will be understood that the following amplifier tube may have a single tuned circuit in its plate circuit, and that additional similar I. F. amplifier stages may be cascaded prior to the second detector. In addition, it is to be clearly understood that the transformer 2 can be replaced by a single tuned circuit. In the case of each of the single tuned circuits employed in cascade with the illustrative circuit 4—3 it will be understood that the invention may be applied in common to each of them.

According to my present invention, the response curve of resonant circuit 4—3 is apparently widened out to have a substantially flat-topped, band-pass response. This is accomplished by shunting across the resonant selector circuit 4—3 the plate to cathode impedance of an electronic reactance tube 6. Those skilled in the art at the present time are fully aware of this method of producing an electronic reactance. The inductive element 7, shown in Fig. 1 by dashed line in shunt across coil 3, represents the simulated inductive reactance provided between the plate and cathode of tube 6. This simulated inductive effect is produced by connecting the plate 8 of tube 6 to the high alternating potential side of coil 3, the cathode of tube 6 being connected to ground through the usual self-biasing resistor. A phase shifter comprising resistor 9 in series with condenser 10 is arranged between ground and a direct current blocking condenser 11. The first control grid 12 of tube 6 is connected to the junction of resistor 9 and condenser 10.

Alternating current voltage developed across condenser 10 is applied to grid 12. This alternating current voltage is in phase quadrature with the alternating voltage existing at plate 8, if the capacitative reactance of condenser 10 is very small compared to the resistance of resistor 9. In this situation the plate to cathode impedance of tube 6 appears to act like an inductance across coil 3. It is for this reason that the inductance effect 7 is shown in shunt across coil 3. The magnitude of the inductive reactance effect 7 is readily varied by varying the gain of tube 6. This is accomplished by employing a second grid in tube 6 to vary the space current flow of the tube. The second grid is denoted by the numeral 13, and it is shielded from the grid 12 by a positive screening electrode.

According to my invention the voltage of control grid 13 is varied periodically by a source of alternating current voltage. This source of alternating current voltage is designated by numeral 14, and it preferably operates at a superaudible frequency. For example, a frequency above 5 kilocycles per second can be effectively employed for this purpose. Tuned circuit 15 is provided in coupled relation to the source 14, and is tuned to the superaudible frequency of source 14. The resonant circuit 15 is shunted by the resistance of a potentiometer whose adjustable tap 18 is connected to the grid 13. The potentiometer 17—18 functions as a band width control device, since it controls the degree or depth of modulation which is applied to the resonant circuit 4—3.

The tuning of resonant selector circuit 4—3 is varied or modulated with respect to the resonant frequency thereof to an extent dependent upon the effective magnitude of the reactance 7. It will be obvious that the gain of tube 6 is varied at the superaudible rate of source 14 by virtue of the fact that the grid 13 has its potential varied at the aforesaid superaudible rate. This means that the normal value of reactance 7 will periodically vary through a cycle such that it has a predetermined magnitude greater than normal and a predetermined magnitude less than normal for each cycle of the source 14.

In Fig. 2 there is graphically portrayed the effect of reactance tube 6 on the response curve of selector circuit 4—3 as the source 14 varies the potential of grid 13 at the superaudible rate. It will be seen that the single-peak response curve is shifted periodically by equal amounts to the left and to the right of the normal or mean resonance frequency value. The over-all effect of this periodic shifting of the response curve is to produce an apparent band-pass response curve whose top is substantially flat. Since this periodic shifting of the single-peak resonance curve is occurring at a superaudible rate it will not be apparent to the ear of the listener. It is to be clearly understood that while I have only shown the frequency modulation of one tuned circuit, it would be desirable to frequency modulate all the tuned circuits from the common modulating source 14.

Variations in signal carrier amplitude can be utilized to vary the normal value of the reactance 7. This can be accomplished in the manner shown in Fig. 3 wherein I. F. energy is rectified. The resulting direct current voltage may then be employed to regulate the degree of modulation of the reactance tube. Thus, during periods of low signal carrier amplitude the control over the magnitude of inductance 7 would be such that increased selectivity would result. That is to say, the extent of shifting of the normal resonance curve would be less than in the case when the received signal carrier amplitude was of a high value. It is, also, to be understood that the invention is not limited to the production of an inductive reactance effect across the resonant selector circuit, since a capacitative effect can be produced by merely reversing the positions of the resistor and condenser of the phase shifter, and having the resistor of small magnitude compared to the condenser reactance.

Within my general concept it is possible to maintain the response characteristic of the I. F. amplifier of relatively narrow width but with a substantially flat-topped, band-pass shape of constant width. The local oscillator in that case is periodically varied in frequency to secure passage of a relatively wider band of received frequencies through the narrow I. F. amplifier. In Fig. 3 I have shown such a system. Here the numeral 20 schematically designates the usual tunable radio frequency amplifier which feeds the amplified signal energy to the first detector 21. The I. F. amplifier 22 is fed with the intermediate frequency energy. The amplifier 22 may comprise one or more stages of fixedly-tuned I. F. amplification. In Fig. 4 I have shown the flat-topped, band-pass characteristic which is chosen for the I. F. amplifier network 22. This I. F. amplifier response curve will be sufficiently wide to pass uniformly all the frequency components of one of the side bands of the I. F. energy. In the case of a broadcast receiver the I. F. response curve will be 5 kc. wide, since each channel is 10 kc. wide. The amplified I. F. energy will be transmitted to any desired type of second detector circuit.

The local oscillator 23 is provided with the usual tunable tank circuit 24. The latter may comprise the customary parallel resonant circuit consisting of coil 25 and tuning condenser 26.

Since those skilled in the art are fully acquainted with these schematic networks as thus far described, it is not believed necessary to give any further explanation concerning the superheterodyne system. According to my invention the reactance tube has its plate to cathode impedance connected across the tank coil 25. Since the reactance tube circuits are substantially similar to those shown in Fig. 1, the same numerals will be employed in Fig. 3. Thus, tube 6 has its plate 8 connected by the direct current blocking condenser 8' to the high potential side of the tank circuit 24. The cathode of tube 6 is, of course, connected to ground through the self-biasing resistor. The simulated inductive reactance effect 7 is again shown across the oscillator coil 25. The potential for the plate 8 of the reactance tube may be supplied from a point of suitable positive potential through a radio frequency choke coil 6'. The alternating voltage for the grid 12 is derived from across the phase shifter condenser 10. The grid 13 has applied to it the voltage of superaudible frequency by means of coupling tube 40. The resonant circuit 15 again tunes the circuit of reactance tube grid 13 to the superaudible frequency.

To describe the action of the reactance tube thus far, it is pointed out that the tube 6 produces, or simulates, an inductive reactance effect 7 across the tank circuit. This inductive reactance 7 varies in magnitude with respect to the selected oscillator frequency in a periodic manner due to the voltage from source 14. Hence, the oscillator frequency will be frequency modulated at the superaudible frequency. Let it be assumed that Fig. 5 shows the mean or carrier frequency and the modulation upper and lower side bands of the received signal wave. The band covers 10 kc., for example. Frequency modulation of the local oscillator 23 results in a rapid shifting of the signal carrier $F_c$ at the superaudible rate of source 14. Hence, there would be alternate transmission of the upper modulation side band and the lower modulation side band through amplifier 22. In that case, the average output of the band-pass I. F. amplifier 22 would cover a frequency range dependent upon the degree of modulation applied to the oscillator. It will be clearly understood that the grid 13 could be coupled to source 14 by a potentiometer, in a manner similar to that shown in Fig. 1, in order to regulate the degree of modulation to be applied to the local oscillator.

I have shown an illustrative method in Fig. 3 for rendering the action of the reactance tube 6 automatically dependent upon received signal carrier strength. A portion of the I. F. energy is schematically represented as being fed to a rectifier of the diode type. This rectifier 30 has a tuned input circuit 31 resonated to the operating I. F. value. The bypassed load resistor 32, whose lower end is grounded, provides a unidirectional voltage whose magnitude is proportional to the carrier amplitude. The lead 33 is connected to the cathode end of load resistor 32, and the voltage transmitted over lead 33 is filtered through the filter resistor 34 before the voltage is used as control voltage at tube 40. In other words, the connection 33 is a selectivity control connection which is automatic in action.

The selectivity control is dependent upon the signal carrier amplitude. If the carrier amplitude increases, then the cathode end of resistor 32 will become increasingly positive relative to ground. As a result the grid 41 of coupling tube 40 will become increasingly positive, and causes the gain of tube 40 to increase. This, in turn, will result in an increase in the transfer of superaudible frequency energy from source 14 to grid 13. Consequently, the extent or degree of modulation of oscillator 23 will increase. If the received signal carrier amplitude becomes very small, then the superaudible frequency energy transferred will be decreased and the simulated inductance 7 will have a smaller effect on the frequency of the tank circuit. In other words, there is thus provided a method of automatically controlling the extent to which the superaudible frequency oscillator source is capable of frequency modulating the local oscillator 23.

It will now be seen that in the system of Fig. 3 there occurs a rapid frequency shifting or sweeping of the received carrier and its side bands relative to the constant narrow band width of I. F. amplifier 22. The degree to which the carrier is shifted depends on the amplitude of the superaudible frequency energy, which, in turn, determines the effective value of the simulated reactance 7 across the oscillator circuit 24. The rate of shifting is determined by the frequency of source 14. The plate 42 of tube 40 feeds into the tuned circuit 15 of the reactance tube, and the input grid 43 is fed directly with the superaudible frequency energy. The constants of the phase shifter, reactance tube and source 14 are so chosen that for strong signal reception the carrier $F_c$ is shifted to $F_c+f_m$ periodically and at the superaudible rate thereby to permit its lower side band $F_c-f_m$ to also pass the amplifier 22.

While I have indicated and described several systems for carrying my invention into effect, it will be apparent to one skilled in the art that my invention is by no means limited to the particular organizations shown and described, but that many modifications may be made without departing from the scope of my invention.

What I claim is:

1. In a superheterodyne radio receiver of the type provided with an intermediate frequency amplifier which has a band-pass response of a width substantially narrower than the channel width of received signal-modulated carrier waves a local oscillator for supplying waves of a predetermined frequency for heterodyning with received signal-modulated carrier waves to produce corresponding signal-modulated waves having a channel width including the intermediate frequency band-pass; means for periodically shifting at a superaudible rate the frequency of the waves supplied by the local oscillator to secure passage of a relatively wider band of received signal-carrier frequencies through the narrow band-pass of said intermediate frequency amplifier; and selectivity control means connected to respond solely to the amplitude of the signal-modulated waves for controlling the frequency-shifting range of the periodically shifting means.

2. In a band-pass system having input and output connections for receiving signal-modulated electric waves within a modulation channel and selectively passing to the output connections those waves having frequencies within a desired portion of the modulation channel: wave-conducting circuit elements for passing modulated waves from the input to the output connections, said circuit elements including a pair of conductors for carrying the waves, selective circuit means connected between the conductors and having a narrow selectivity for causing the conductors to selectively pass a band of waves narrower than said modulation channel; selectivity-broadening elements connected for sweeping said narrow selectivity over a displacement range essentially within said modulation channel, at a frequency higher than the highest frequency of modulation signal, to pass a correspondingly broadened band of modulated waves in which the sweeping does not interfere with the modulation signals and automatic selectivity control means connected to respond to the amplitude of the signal-modulated waves for controlling said displacement range.

3. In a band-pass system having input and output connections for receiving signal-modulated electric waves within a modulation channel and selectively passing to the output connections those waves having frequencies within a desired portion of the modulation channel: wave-conducting circuit elements for passing modulated waves from the input to the output connections, said circuit elements including a pair of conductors for carrying the waves, resonant circuit means connected between the conductors and having a narrow resonance selectivity for causing the conductors to selectively pass a band of waves narrower than said modulation channel; selectivity-broadening elements connected to shift the resonance of the resonant circuit means and to sweep this shift over a displacement range corresponding essentially to said modulation channel, at a frequency higher than the highest frequency of modulation signal, to pass a correspondingly broadened band of modulated waves in which the sweeping does not interfere with the modulation signals.

MURRAY G. CROSBY.

REFERENCES CITED

The following references are of record in the file of this patent:

UNITED STATES PATENTS

| Number | Name | Date |
|---|---|---|
| 2,083,232 | Koch | June 8, 1937 |
| 2,084,760 | Beverage | June 22, 1937 |
| 2,115,676 | Wheeler | Apr. 26, 1938 |
| 2,206,695 | Guanella | July 2, 1940 |
| 2,213,886 | Potter | Sept. 3, 1940 |
| 2,216,160 | Curtis | Oct. 1, 1940 |
| 2,261,800 | Freeman | Nov. 4, 1941 |
| 2,262,707 | Farrington | Nov. 11, 1941 |
| 2,279,151 | Wallace | Apr. 7, 1942 |
| 2,282,973 | Koch | May 12, 1942 |
| 2,287,925 | White | June 30, 1942 |

FOREIGN PATENTS

| Number | Country | Date |
|---|---|---|
| 101,039 | Australia | May 27, 1937 |

OTHER REFERENCES

Bell: "Reduction of Band Width in F. M. Receivers," (Wireless Engineer, November 1942).